United States Patent
Majors et al.

(10) Patent No.: US 6,264,872 B1
(45) Date of Patent: Jul. 24, 2001

(54) METHOD OF FORMING THIN, EMBOSSED, TEXTURED BARRIER FILMS

(75) Inventors: Mark Bruce Majors, Marietta; Billy Ray Jones, Cumming, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/205,904

(22) Filed: Dec. 4, 1998

Related U.S. Application Data

(60) Provisional application No. 60/068,965, filed on Dec. 30, 1997.

(51) Int. Cl.[7] .................................................. B29C 59/04
(52) U.S. Cl. .......................... 264/284; 264/293; 425/505; 425/365; 425/385; 156/199; 156/209
(58) Field of Search .................................. 264/282, 283, 264/284, 293; 425/505, 365, 385; 156/183, 199, 209

(56) References Cited

U.S. PATENT DOCUMENTS

| | | | |
|---|---|---|---|
| 3,542,634 | 11/1970 | Such et al. | 161/88 |
| 3,559,568 | * 2/1971 | Stanley | 101/32 |
| 3,855,046 | 12/1974 | Hansen et al. | 161/150 |
| 3,857,144 | 12/1974 | Bustin | 28/72 |
| 3,875,942 | 4/1975 | Roberts et al. | 128/287 |
| 3,914,365 | 10/1975 | Kim et al. | 264/147 |
| 3,922,329 | 11/1975 | Kim et al. | 264/147 |
| 3,947,127 | 3/1976 | Bennett et al. | 356/124 |
| 3,965,906 | 6/1976 | Karami | 128/287 |
| 4,000,242 | 12/1976 | Hartbauer | 264/284 |
| 4,041,203 | 8/1977 | Brock et al. | 428/157 |
| 4,101,358 | 7/1978 | Kim et al. | 156/167 |
| 4,153,664 | 5/1979 | Sabee | 264/289 |
| 4,153,751 | 5/1979 | Schwarz | 428/304 |
| 4,186,781 | 2/1980 | Kim et al. | 139/420 |
| 4,207,375 | 6/1980 | Kim et al. | 428/286 |
| 4,280,978 | 7/1981 | Dannheim et al. | 264/156 |
| 4,333,979 | * 6/1982 | Sciaraffa et al. | 428/179 |
| 4,629,452 | 12/1986 | Wahlberg et al. | 604/177 |
| 4,629,457 | 12/1986 | Ness | 604/382 |
| 4,734,324 | 3/1988 | Hill | 428/317.3 |
| 4,777,073 | 10/1988 | Sheth | 428/155 |
| 4,798,604 | 1/1989 | Carter | 604/383 |
| 4,806,300 | 2/1989 | Walton et al. | 264/288.8 |
| 4,849,054 | 7/1989 | Klowak | 162/109 |

(List continued on next page.)

FOREIGN PATENT DOCUMENTS

| | | |
|---|---|---|
| 2614160 A1 | 10/1977 | (DE) . |
| 0 164 740 A3 | 12/1985 | (EP) . |
| 0 403 187 B1 | 12/1990 | (EP) . |
| 0 535 581 A1 | 4/1993 | (EP) . |
| 0 489 782 B1 | 5/1993 | (EP) . |
| 0 596 191 A1 | 5/1994 | (EP) . |
| 0 596 532 A1 | 5/1994 | (EP) . |
| 0 515 501 B1 | 6/1994 | (EP) . |
| 0 598 971 A1 | 6/1994 | (EP) . |
| 0 617 602 B1 | 10/1994 | (EP) . |
| 0 630 737 A1 | 12/1994 | (EP) . |
| 96/39109 A1 | 12/1996 | (EP) . |
| 2186233 | 8/1987 | (GB) . |
| 91/03367 | 3/1991 | (WO) . |

(List continued on next page.)

*Primary Examiner*—Jan H. Silbaugh
*Assistant Examiner*—Michael I. Poe
(74) *Attorney, Agent, or Firm*—James B. Robinson

(57) ABSTRACT

Embossed textured films are made by feeding a thin thermoplastic polymer barrier film through the nip of a bonding roll assembly having a patterned roll and an anvil roll rotating at different circumferential speeds which differ by 5% to 200%. The bond pattern is imparted to the film as well as additional texture due to the differential speeds of the rollers thereby creating an embossed, textured barrier film having improved hand and a hydrohead in excess of about 30 mbar.

23 Claims, 1 Drawing Sheet

U.S. PATENT DOCUMENTS

| | | | |
|---|---|---|---|
| 4,854,984 | 8/1989 | Ball et al. | 156/73.5 |
| 4,863,785 | 9/1989 | Berman et al. | 428/218 |
| 4,867,881 | 9/1989 | Kinzer | 210/490 |
| 4,882,213 | 11/1989 | Gaddis et al. | 428/136 |
| 4,902,366 * | 2/1990 | Bader | 156/296 |
| 4,908,163 * | 3/1990 | McAmish et al. | 264/12 |
| 4,919,738 | 4/1990 | Ball et al. | 156/73.5 |
| 5,028,289 | 7/1991 | Rasmussen | 156/229 |
| 5,143,774 * | 9/1992 | Cancio et al. | 428/169 |
| 5,262,107 | 11/1993 | Hovis et al. | 264/145 |
| 5,318,842 | 6/1994 | Ogale | 428/349 |
| 5,328,450 | 7/1994 | Smith et al. | 602/59 |
| 5,370,764 | 12/1994 | Alikhan | 156/553 |
| 5,409,992 | 4/1995 | Eppert, Jr. | 525/88 |
| 5,424,115 * | 6/1995 | Stokes | 428/198 |
| 5,472,775 | 12/1995 | Obijeski et al. | 428/220 |
| 5,503,907 * | 4/1996 | Gessner et al. | 428/198 |
| 5,560,974 | 10/1996 | Langley | 428/198 |
| 5,614,281 | 3/1997 | Jackson et al. | 428/100 |
| 5,616,408 * | 4/1997 | Oleszczuk et al. | 442/346 |
| 5,620,779 | 4/1997 | Levy et al. | 428/167 |
| 5,628,097 | 5/1997 | Benson et al. | 28/165 |
| 5,855,999 | 1/1999 | McCormack | 428/283 |
| 6,053,232 * | 4/2000 | Biagiotti | 156/459 |

FOREIGN PATENT DOCUMENTS

| | | |
|---|---|---|
| 91/12125 | 8/1991 | (WO) . |
| 93/11725 | 6/1993 | (WO) . |
| 93/22995 | 11/1993 | (WO) . |
| 94/20298 | 9/1994 | (WO) . |
| 93/13773 | 5/1995 | (WO) . |
| 96/19346 | 6/1996 | (WO) . |
| 96/19349 | 6/1996 | (WO) . |
| 97/02133 | 1/1997 | (WO) . |

* cited by examiner

METHOD OF FORMING THIN, EMBOSSED, TEXTURED BARRIER FILMS

This application claims priority from U.S. Provisional Application No. 60/068,965 filed on Dec. 30, 1997, the entire content of which is incorporated herein by reference.

FIELD OF THE INVENTION

The present invention relates to barrier films. More particularly the present invention relates to embossed barrier films and methods of making the same.

BACKGROUND OF THE INVENTION

Films have been utilized in a variety of articles as a means of providing a barrier to the passage of physical matter. As an example films have been utilized as a barrier layer in rain wear, diapers and incontinence garments, feminine hygiene products, protective apparel and other articles. Barrier films are typically employed within such articles to prevent the passage of physical matter such as, for example, water, bodily exudates, blood, toxic materials, pathogens, etc. Due to the nature of such articles the usefulness and reliability of the same is related to the articles ability to provide the desired barrier properties. Thus, it follows that loss of the barrier properties through film defects, e.g. pin holes or tears, often destroys the usefulness of the entire article. Providing reliable barrier properties is of even greater importance in infection control products and protective apparel since these articles seek to prevent potentially dangerous matter such as blood borne pathogens or toxic agents from coming in to direct physical contact with the wearer.

However, in addition to providing the desired barrier function, since these articles are often worn or handled it is also desirable that the article have a pleasing touch or "hand." Desirably the film has a drape and feel similar to that of cloth or other apparel fabrics. Providing a film capable of exhibiting excellent barrier properties while likewise having good drape and hand has proven difficult. Thus, there exists a need for economically produced films having improved visual and/or tactile properties which also exhibit and retain excellent barrier properties.

In the past film and/or film laminates have been processed with heated patterned rolls in order to create embossed patterns therein. As an example, U.S. Pat. No. 3,857,144 to Bustin recognizes the difficulty in embossing thin films to create a "hole-free" film and teaches use of matching patterned rolls driven at the same circumferential speed to emboss polyethylene films having a thickness less than 0.025 mm. Alternatively, heated patterned rolls have been extensively used to aperture films or other materials. For example, U.S. Pat. No. 4,280,978 to Dannheim et al. teaches embossing and aperturing a film using a series of patterned rolls. Additionally, U.S. Pat. No. 5,620,779 to Levy et al. teaches the use of one or more heated patterned calendar rolls to create fused bonded areas which rupture, i.e. form apertures, upon stretching of the fabric. As a further example, U.S. Pat. No. 5,370,764 to Alikhan teaches pattern bonding a film/nonwoven laminate using two patterned bonding rolls rotating at different circumferential speeds in order to enhance formation of apertures within the film. However, despite the foregoing, it has been found that use of counter-rotating bonding rolls rotating at different circumferential speeds can be utilized to achieve a film having an improved texture or hand without forming apertures or overly weakened areas of the film, that is to say without destroying the barrier properties of the film.

SUMMARY OF THE INVENTION

The aforesaid needs are fulfilled and the problems experienced by those skilled in the art overcome by the process of the present invention of forming an embossed, textured barrier film comprising (a) providing a thermoplastic polymer film having a hydrohead of at least 30 mbar; (b) causing the thermoplastic film to travel through the nip of a counter-rotating bonding roll assembly formed by first and second rolls rotating at different circumferential speeds wherein the resulting film has a pattern imparted therein, a textured surface and a hydrohead of at least 30 mbar. Desirably the first and second rolls have a speed differential between about 5% and about 200%. In a further aspect, the film can be heated either prior to entering the nip or while within the nip. As an example, one or both of the nip rolls can be heated. In still a further aspect of the invention, the first or patterned roll rotates at a greater circumferential speed than the second roll. Alternatively, the second roll is a smooth roll which rotates at a greater circumferential speed than that of the first roll. In this regard, running the patterned roll faster creates a film having an embossed film with a ridge and valley type structure whereas running the smooth roll faster creates an embossed film having a creped or undulated type structure. Selection of the film temperature, speed differential and nip pressure can be made to create a more highly embossed and/or textured film.

Definitions

As used herein the term "comprising" is inclusive or open ended and does not exclude additional unrecited elements, compositional components, or method steps.

As used herein the term "nonwoven" fabric or web means a web having a structure of individual fibers or threads which are interlaid, but not in an identifiable manner as in a knitted or woven fabric. Nonwoven fabrics or webs have been formed by many processes such as for example, meltblowing processes, spunbonding processes, hydroentangling, air-laid and bonded carded web processes.

As used herein the term "spunbond fibers" refers to small diameter fibers of molecularly oriented polymeric material. Spunbond fibers may be formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,502,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, U.S. Pat. No. 5,382,400 to Pike et al.

As used herein the term "meltblown fibers" means fibers of polymeric material which are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Such a process is disclosed, for example, in U.S. Pat. No. 3,549,241 to Butin et al. Meltblown fibers are generally smaller than 10 microns in average diameter, and are generally tacky when deposited onto a collecting surface.

As used herein "multilayer nonwoven laminate" means a laminate of two or more nonwoven layers such as, for example, wherein some of the layers are spunbond and some meltblown such as a spunbond/meltblown/spunbond (SMS) laminate. Examples of multilayer nonwoven laminates are disclosed in U.S. Pat. No. 4,041,203 to Brock et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate such as by point bonding as described below. Alternatively, the fabric layers may be made individually, collected in rolls, and combined in a separate bonding step.

As used herein, the term "machine direction" or MD means the length of a fabric in the direction in which it is produced. The term "cross machine direction" or CD means the width of fabric, i.e. a direction generally perpendicular to the MD.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" includes all possible geometric configurations of the molecule. These configurations include, but are not limited to isotactic, syndiotactic and random symmetries.

As used herein, "ultrasonic bonding" means a process performed, for example, by passing the fabric between a sonic horn and anvil roll as illustrated in U.S. Pat. No. 4,374,888 to Bornslaeger.

As used herein "point bonding" means bonding one or more layers of fabric at a plurality of discrete bond points. For example, thermal point bonding generally involves passing one or more layers to be bonded between heated rolls such as, for example an engraved pattern roll and a smooth calender roll. The engraved roll is, patterned in some way so that the entire fabric is not bonded over its entire surface, and the anvil roll is usually flat. As a result, various patterns for engraved rolls have been developed for functional as well as aesthetic reasons. One example of a pattern has points and is the Hansen Pennings or "H&P" pattern with about a 10% to about 25% bond area when new and with about 200 bonds/square inch as taught in U.S. Pat. No. 3,855,046 to Hansen and Pennings, the entire contents of which are incorporated herein by reference. Another typical point bonding pattern is the expanded Hansen Pennings or "EHP" bond pattern which produces a 15% bond area when new. Other common patterns include a diamond pattern with repeating and slightly offset diamonds with about a 16% bond area and a wire weave pattern looking as the name suggests, e.g. like a window screen, with about a 15% bond area.

As used herein, the term "barrier" means a film, laminate or other fabric which is relatively impermeable to the transmission of liquids and which has a hydrohead of at least 30 mbar water. Hydrohead as used herein refers to a measure of the liquid barrier properties of a fabric as described herein below.

As used herein, the term "breathability" refers to the water vapor transmission rate (WVTR) of an area of fabric. The WVTR of a fabric is the water vapor transmission rate which, in one aspect, gives an indication of how comfortable a fabric would be to wear. WVTR can be measured as indicated below and the results are reported in grams/square meter/day (g/m$^2$/24 hours).

As used herein the term "blend" means a mixture of two or more polymers while the term "alloy" means a sub-class of blends wherein the components are immiscible but have been compatibilized.

As used herein, the term "scrim" means a lightweight fabric used as a backing material. Scrims are often used as the base fabric for coated or laminated products.

As used herein, the term "protective garment" means any type of non-medically oriented apparel which may be worn. This includes rain wear as well as industrial or work wear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets and the like.

As used herein, the term "personal care product" means personal hygiene oriented items such as diapers, training pants, absorbent underpants, adult incontinence products, feminine hygiene products, and the like.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths, picnic area covers and the like.

DESCRIPTION OF THE PREFERRED EMBODIMENTS

Figure 1:
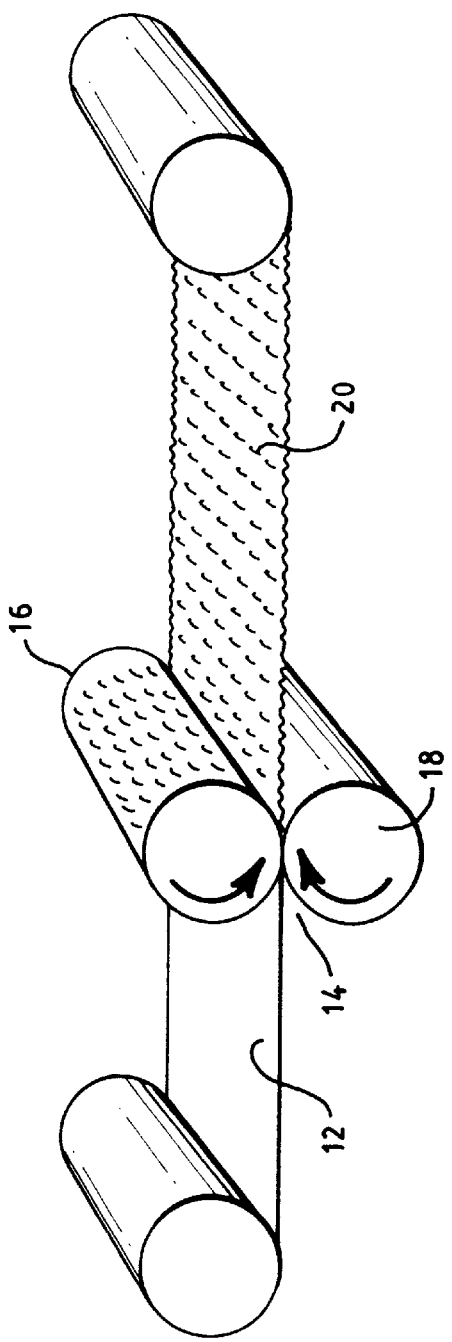
FIG. 1 is a schematic representation of an exemplary bonding roller assembly for practicing the present invention.

A variety of polymeric films can be used in connection with the present invention. The films desirably have a basis weight less than about 65 g/m$^2$ and even more desirably less than about 35 g/m$^2$. In a preferred embodiment the thin films have basis weights between about 15 g/m$^2$ and about 35 g/m$^2$. In a further aspect the polymeric films have a thickness of less than about 50$\mu$ and even more desirably have a thickness of between about 12$\mu$ and about 30$\mu$. As used herein the "film thickness" refers to the distance between the opposed surfaces of the film and not the height of any undulations or projections relative to the plane of the film. Suitable methods of forming thin polymeric films are well known in the art and include, but are not limited to, cast and blown film processes. Thermoplastic films can also be heated and subsequently stretched while heated to form a film having the desired basis weight and/or thickness. In addition, multilayer films may also be used in connection with the present invention. As an example, methods of forming multi layer films are disclosed in U.S. Pat. No. 4,522,203; U.S. Pat. No. 4,494,629; U.S. Pat. No. 4,734,324; U.S. Pat. No. 5,261,899 and U.S. patent application Ser. No. 08/359,986, now U.S. Pat. No. 6,075,179; the entire contents of the aforesaid references are incorporated herein by reference.

In many articles employing barrier films it will be advantageous for the film to be a breathable barrier, i.e. the ability to allow gas and/or vapor to pass therethrough while acting as a barrier to liquid and/or particulate matter. Breathable barrier fabrics are often preferred over non-breathable barrier materials since breathable barrier fabrics allow moisture trapped beneath the fabric to escape as water vapor. Thus, apparel using breathable barrier fabrics is generally more comfortable to wear since the migration of water vapor through the fabric helps to reduce and/or eliminate discomfort resulting from excess moisture trapped against the skin.

Breathable barrier films are known in the art and desirably have a WVTR of at least 300 $g/m^2/day$, and more desirably having a WVTR in excess of 1500 $g/m^2/day$ and even in excess of 3000 $g/m^2/day$. Exemplary breathable barrier films suitable for practicing the present invention include, but are not limited to, breathable microporous films. Breathable microporous films are known in the art and various forms of which are described in the following references: U.S. patent application Ser. No. 08/169,826 to McCormack, now U.S. Pat. No. 5,695,868; U.S. patent application Ser. No. 08/359,986 to McCormack et al., now U.S. Pat. No. 6,075,179; U.S. patent application Ser. No. 08/722,726 filed Oct. 1, 1996 to McCormack et al.; U.S. patent application Ser. No. 05/883,164 filed Jun. 26, 1997 to McCormack et al.; U.S. patent application Ser. No. 08/843,147 filed Apr. 25, 1997 to Gwaltney et al; and U.S. Patent Application 09/122,326 filed Jul. 24, 1998 to Shawver et al; U.S. Pat. No. 4,777,073 to Sheth; and U.S. Pat. No. 4,867,881 to Kinzer; the entire content of the aforesaid references are incorporated herein by reference. A preferred breathable microporous film can comprise a stretched-filled film which includes a thermoplastic polymer and filler. These (and other) components can be mixed together, heated and then extruded into a monolayer or multilayer film. The filled film may be made by any one of a variety of film forming processes known in the art such as, for example, by using either cast or blown film equipment. The thermoplastic polymer and filler can be stretched in at least one direction, thereby reducing the film thickness and creating a network of micropores of a size and frequency to achieve the desired level of breathability. Such films, prior to stretching, desirably have a basis weight of less than about 100 $g/m^2$ and even more desirably less than about 60 $g/m^2$. Upon stretching the multilayer film desirably has a basis weight between about 15 and about 35 $g/m^2$.

The films can comprise thermoplastic polymers suitable for film formation. Film forming polymers believed suitable for use with the present invention, alone or in combination with other polymers, include polyolefins, ethylene vinyl acetate, ethylene ethyl acrylate, ethylene acrylic acid, ethylene methyl acrylate, ethylene normal butyl acrylate, polyester, polyethylene terephthalate, polyamides, ethylene vinyl alcohol, polystyrene, polyurethane, polybutylene, and polybutylene terephthalate.

Preferred thermoplastic polymers useful in the fabrication of films of the present invention include, but are not limited to, polyolefins including homopolymers, copolymers, terpolymers and blends thereof. In addition, polyolefin based films are also believed particularly well suitable for use in the present invention. For purposes of the present invention a polymer is considered to be "polyolefin-based" if the polymeric portion of the film, exclusive of any filler materials, comprises at least 50 weight percent polyolefin polymer. Exemplary polyolefin polymers include polyethylene and polypropylene as well as copolymers, terpolymers and blends thereof; examples include, but are not limited to, linear low density polyethylene (LLDPE) and ethylene-propylene copolymer blends. Preferred polyolefin polymers also include polymers wherein the propylene and/or ethylene monomers are polymerized with an alpha-olefin such that the resulting polymer composition has a narrow molecular weight distribution, homogeneous branching and/or controlled long chain branching. Suitable alpha-olefins include, but are not limited to, 1-octene, 1-butene, 1-hexene and 4-methyl-pentene. Exemplary polyolefin copolymers include those made by "metallocene," "constrained geometry" or "single-site" catalysts such as those described in U.S. Pat. No. 5,472,775 to Obijeski et al.; U.S. Pat. No. 5,451,450 to Erderly et al.; U.S. Pat. No. 5,204,429 to Kaminsky et al.; U.S. Pat. No. 5,539,124 to Etherton et al.; and U.S. Pat. No. 5,554,775 to Krishnamurti et al.; U.S. Pat. Nos. 5,278,272 and 5,272,236, both to Lai et al.; *The Encyclopedia of Chemical Technology*, Kirk-Othemer, Fourth Edition, vol. 17, Olefinic Polymers, pp.765–767 (John Wiley & Sons 1996), the entire contents of the aforesaid references are incorporated herein by reference.

In addition, the film may optionally include one or more additives and/or stabilizers. Desirably the filled film includes an anti-oxidant such as, for example, a hindered phenol stabilizer. Commercially available anti-oxidants include, but are not limited to, IRGANOX™ E 17 ($\alpha$-tocopherol) and IRGANOX™ 1076 (octodecyl 3,5-ditert-butyl-4-hydroxyhydrocinnamate) which are available from Ciba Specialty Chemicals of Terrytown, N.Y. In addition, other stabilizers or additives which are compatible with the film forming process, stretching and any subsequent lamination steps may also be employed with the present invention. For example, additional additives may be added to impart desired characteristics to the film such as, for example, melt stabilizers, processing stabilizers, heat stabilizers, light stabilizers, heat aging stabilizers and other additives known to those skilled in the art. Further, bonding agents and/or tackifiers may likewise be added to the film to improve adhesion to other layers as desired.

Once the film having the desired thickness and/or other characteristics is obtained the film can be processed in accord with the present invention to create a textured film having improved aesthetics and/or hand. Desirably the film is treated in accord with the teachings provided herein to create a film having an improved drape and/or cloth-like feel. In reference to FIG. 1, a thin film 12 is fed into nip 14 created by counter-rotating first and second bonding rolls 16, 18. The rotation of first and second rolls 16, 18 pull film 12 through nip 14. However, the circumferential speed of first and second rolls 16, 18 is selected such that there exists a speed differential between the two rolls. The speed differential and patterned roll(s) impart the pattern into the film as well as additional textured structure thereby forming embossed, textured film 20.

At least one of the two bonding rolls is patterned having a plurality of raised regions. Preferably first roll 16 is patterned and second roll 18 is a smooth roll. Each of the bonding rolls desirably have a hard surface, such as steel rolls, although other materials are believed suitable with the present invention. Either the patterned roll or smooth roll can be configured to have a greater circumferential speed than the opposed roll. However, selection of the speed of the first and second bonding rolls will be made with respect to the desired texture of the film. Having the bonding rolls configured such that the patterned roll has a greater circumferential speed creates a film generally having a ridge and valley type topography. Configuring the bonding rolls such that the smooth roll has a greater circumferential speed produces a distinct film topography and texture. These films exhibit a "creped" or undulated structure. The unique structure of the film provides improved hand or texture to the barrier film without destroying the barrier function of the film.

In order to prevent aperturing of the film or creation of overly weakened areas which destroy the barrier properties of the film, the nip pressure, polymer composition, film temperature and differential speed of the nip rolls must be selected in relation to one another. Generally, the difference in circumferential speed of the rolls, ΔS, is preferably not greater than about 200%. Desirably ΔS is between about 5% and about 150% and even more desirably between about 10% and about 75%. Use of little or no heat allows for higher speed differentials whereas use of heat (and a correspondingly higher film temperature) decreases the speed differentials available to avoid destruction of the barrier properties of the film. In addition, as the nip length increases lower AS is required to create aperturing and/or significant degradation of film barrier properties. The nip length is a function of the roll diameter and nip pressure, e.g. larger diameter rolls will have larger nip lengths. Further, lower nip pressures are generally preferred and desirably are less than about 1200 pli and even more desirably between about 200 pli and about 800 pli.

Embossing can be done with or without heating the film. Desirably the film is not heated to a temperature at or above the melting point nor one significantly above the softening point. Generally, as the temperature of the film increases the lower the ΔS values as required to cause aperturing. The film can be heated prior to entering the nip and/or within the nip. For example, the film can be heated by the use of one or more heated nip rolls. As a specific example, for polyethylene polymer films desirably the nip rolls have an actual temperature less than about 120° C. and still more desirably between about 50° C. and about 105° C.

Figure 2:
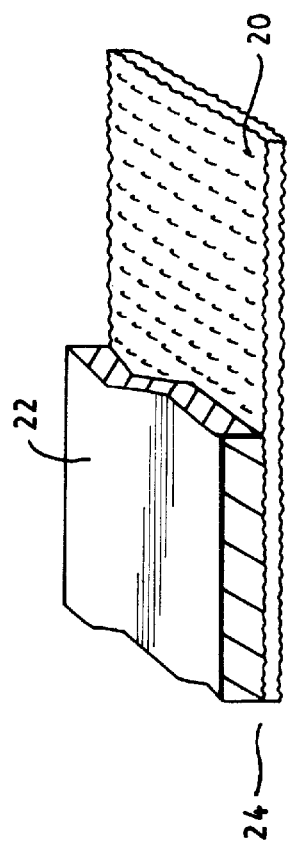
FIG. 2 is a partially elevated side view of a partially cut-away film laminate of the present invention.

The embossed, textured film can be incorporated into any one of numerous articles as desired to provide barrier properties and/or improved hand. Often it will be advantageous for the embossed, textured film to be employed as the inner or outer most layer of an article. The embossed, textured film can optionally be attached to one or more additional layers capable of being laminated to the embossed, textured film to form a cohesive multilayer laminate. The additional layer(s) may comprise, as an example, nonwoven webs, multilayer nonwoven laminates, scrims, woven fabrics, foams and/or other pliable materials. Desirably the additional layer(s) comprises one or more layers of spunbonded and/or meltblown fiber webs. The composition of the layer may be selected as desired to achieve a material having the desired properties, i.e. hand, aesthetics, tensile strength, cost, abrasion resistance, etc. In one embodiment the outer layer may comprise about a 10 g/m² to about 70 g/m² web of spunbond fibers and even more desirably a 10 g/m² to about 30 g/m² web of spunbond fibers. The layer(s) can be bonded to the film by various means known in the art such as, for example, thermal, ultrasonic, adhesive or other bonding means. Thermal point bonding or use of a patterned adhesive may be particularly desirable when employing a breathable microporous film. In addition, the embossed textured film can be attached to a resilient deformable material such as a nonwoven web or foam to form an outer baffle or barrier of a shaped product. As an example, the embossed textured film can be thermoformed with a resilient deformable nonwoven into a shaped structure such as feminine hygiene product. Resiliently compressible shaped barrier articles are described in U.S. patent application Ser. No. 08/445,149 to Datta et al., the entire contents of which are incorporated herein by reference. In reference to FIG. 2, the embossed textured film 20 is laminated to a pliable material 22 to form a cohesive multilayer laminate 24.

The barrier laminates of the present invention can be used to make and/or comprise a component of protective covers, infection control products, personal care products, garments and other articles that desirably have barrier properties, hand and the desired drape and/or resilient deformability. As examples thereof, the barrier laminates may be used as back sheet or an outer cover in a diaper, adult incontinence garments, surgical gown, or as an outer baffle in a feminine hygiene product.

Tests

Hydrohead: A measure of the liquid barrier properties of a fabric is the hydrohead test. The hydrohead test determines the height of water or amount of water pressure (in millibars) that the fabric will support before liquid passes therethrough. A fabric with a higher hydrohead reading indicates it has a greater barrier to liquid penetration than a fabric with a lower hydrohead. The hydrohead can be performed according to Federal Test Standard 191 A, Method 5514. The hydrohead data cited herein was obtained using a test similar to the aforesaid Federal Test Standard except modified as noted below. The hydrohead was determined using a hydrostatic head tester available from Mario Enterprises, Inc. of Concord, N.C. The specimen is subjected to a standardized water pressure, increased at a constant rate until the first sign of leakage appears on the surface of the fabric in three separate areas. (Leakage at the edge, adjacent clamps is ignored.) Unsupported fabrics, such as a thin films, are supported when determining the hydrohead value.

WVTR: The water vapor transmission rate (WVTR) for the sample materials was calculated in accordance with AS TM Standard E96-80. Circular samples measuring three inches in diameter were cut from each of the test materials and a control which was a piece of CELGARD™ 2500 film from Hoechst Celanese Corporation of Sommerville, N.J. CELGAROD™ 2500 film is a microporous polypropylene film. Three samples were prepared for each material. The test dish was a number 60-1 Vapometer pan distributed by Thwing-Albert Instrument Company of Philadelphia, Pa. One hundred milliliters of water were poured into each Vapometer pan and individual samples of the test materials and control material were placed across the open tops of the individual pans. Screw-on flanges were tightened to form a seal along the edges of the pan, leaving the associated test material or control material exposed to the ambient atmosphere over a 6.5 centimeter diameter circle having an exposed area of approximately 33.17 square centimeters. The pans were placed in a forced air oven at 100° F. (32° C.) or 1 hour to equilibrate. The oven was a constant temperature oven with external air circulating through it to prevent water vapor accumulation inside. A suitable forced air oven is, for example, a Blue M Power-O-Matic 60 oven distributed by Blue M. Electric Company of Blue Island, Ill. Upon completion of the equilibration, the pans were removed from the oven, weighed an immediately returned to the oven. After 24 hours, the pans were removed from the oven and weighed again. The preliminary test water vapor transmission rate values were calculated with Equation (I) below:

$$\text{Test WVTR} = (\text{grams weight loss over 24 hours}) \times 315.5 \text{ g/m}^2 124 \text{ hours} \quad (I)$$

The relative humidity within the oven was not specifically controlled. Under the predetermined set conditions of 100° F. (32° C.) and ambient relative humidity, the WVTR for the CELGARD™ 2500 control has been defined to be 5000 grams per square meter for 24 hours. Accordingly, the control sample was run with each test and the preliminary test values were corrected to set conditions using Equation (II) below:

$$\text{WVTR} = (\text{Test WVTR/control WVTR}) \times (5000 \text{ g/m}^2/24 \text{ hours}) \quad \text{(II)}$$

EXAMPLE 1

A 1.1 mil (27.9µ) film of linear low density polyethylene (5.5 melt index) with 4% $TiO_2$ was fed into the nip of a smooth steel roll and a patterned steel roll having a nip pressure of 85 pounds per square inch (about 1000 pounds per linear inch). The patterned roll had small round pins with a pin density of about 600 pins/inch. The patterned roll had an actual temperature of about 215° F. and the smooth roll had an actual temperature of about 190° F. The speed of the patterned roll was set at 43 feet per minute and the speed of the smooth roll at 40 feet per minute. The resulting film had a textured, embossed topography and was non-apertured.

(COMPARATIVE) EXAMPLE 2

The film described in Example I was fed through a similar roller assembly with the exception that the patterned roll had a speed of 45 feet per minute and the smooth roll a speed of 40 feet per minute. The resulting film experienced a loss of barrier properties and was apertured.

EXAMPLE 3

A three layer film having an ABA construction was provided, layer A comprising about 7.5% of the film thickness and comprised linear low density polyethylene and layer B comprising about 55% of the total film thickness and comprised low density polyethylene. The multilayer film was fed through the nip formed by a patterned roll and an anvil roll with a nip pressure of 85 pounds per square inch (about 1000 pounds per linear inch). The patterned roll had small round pins with a pin density of about 600 pins/inch. The patterned roll had a set temperature of 190° F. and a speed of 70 feet per minute whereas the smooth roll had a set temperature of 180° F. and a speed of 30 feet per minute. The resulting film had a textured, embossed structure and was non-apertured.

(COMPARATIVE) EXAMPLE 4

The film described in Example 3 was fed through a similar roller assembly with the exception that the patterned had a speed of 74 feet per minute and the smooth roll a speed of 30 feet per minute. The resulting film experienced a loss of barrier properties and was apertured.

While various patents and other reference materials have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

We claim:

1. A method for forming an embossed textured barrier film comprising:

providing a substrate film comprising thermoplastic polymer and having a hydrohead of at least 30 mbar;

feeding said substrate film through a nip of a counter-rotating bonding roll assembly comprising a first patterned roll and a second roll rotating at different circumferential speeds such that a speed differential between said first patterned roll and said second roll imparts a textured structure into said substrate film and a pattern of said first patterned roll imparts an embossed pattern into said substrate film to thereby form an embossed, textured barrier film having a hydrohead of at least 30 mbar and improved hand and texture; and selecting a nip pressure, a thermoplastic polymer composition, a substrate film temperature and said speed differential between said first patterned roll and said second roll such that said improved hand and texture are achieved without forming apertures or overly weakened areas in said substrate film and without destroying the barrier properties of said substrate film.

2. The method of claim 1 wherein said speed differential is between about 5% and about 200% and wherein said substrate film has a basis weight less than about 35 g/m$^2$.

3. The method of claim 2 further comprising heating said substrate film.

4. The method of claim 3 wherein at least one of said first patterned roll and said second roll is heated.

5. The method of claim 3 wherein said substrate film is heated prior to entering said nip.

6. The method of claim 1 wherein said speed differential is between about 5% and about 150% and wherein said second roll is a smooth roll.

7. The method of claim 6 wherein said thermoplastic polymer comprises a polyethylene polymer.

8. The method of claim 7 wherein at least one of said first patterned roll and said second roll is heated and wherein a roll temperature of said heated roll does not exceed about 120° C.

9. The method of claim 8 where said speed differential is between about 5% and about 75%.

10. The method of claim 1 wherein said first roll rotates at a greater circumferential speed than that of said second roll.

11. The method of claim 10 wherein said speed differential is between about 5% and about 200% and further wherein said substrate film has a basis weight less than about 35 g/m$^2$.

12. The method of claim 11 wherein said speed differential is between about 5% and about 150% and where said second roll is a smooth roll.

13. The method of claim 11 further comprising heating said substrate film.

14. The method of claim 13 wherein said thermoplastic polymer comprises a polyethylene polymer, at least one of said first patterned roll and said second roll is heated, and a roll temperature of said heated roll does not exceed about 120° C.

15. The method of claim 13 wherein said thermoplastic polymer comprises a polyolefin polymer.

16. The method of claim 15 wherein said speed differential is between about 5% and about 75%.

17. The method of claim 1 wherein said second roll is a smooth roll and further wherein said second roll rotates at a greater circumferential speed than said first roll.

18. The method of claim 17 wherein said thermoplastic polymer comprises a polyolefin polymer.

19. The method of claim 17 wherein said thermoplastic polymer comprises an ethylene polymer, at least one of said first patterned roll and said second roll is heated, and a roll temperature of said heated roll is less than about 120° C.

20. The method of claim 19 wherein said speed differential is between about 5% and about 75%.

21. The method of claim 17 wherein said speed differential is between about 5% and about 200%.

22. The method of claim 21 further comprising heating said substrate film.

23. The method of claim 22 wherein said speed differential is between about 5% and about 150%.

* * * * *

UNITED STATES PATENT AND TRADEMARK OFFICE
CERTIFICATE OF CORRECTION

PATENT NO. : 6,264,872 B1  Page 1 of 1
DATED : July 24, 2001
INVENTOR(S) : Mark B. Majors et al.

It is certified that error appears in the above-identified patent and that said Letters Patent is hereby corrected as shown below:

Column 5,
Line 49, "polystirene" should read -- polystyrene --

Column 7,
Line 14, "AS" should read -- ΔS --

Signed and Sealed this

Eleventh Day of June, 2002

Attest:

JAMES E. ROGAN
Attesting Officer  Director of the United States Patent and Trademark Office